V. DORDET.
FILTER.

No. 188,606.

2 Sheets—Sheet 1.

Patented March 20, 1877.

Attest.
Inventor.

V. DORDET.
FILTER.

No. 188,606. Patented March 20, 1877.

2 Sheets—Sheet 2.

Fig. 3.

Inlet

Sponge or Wool prepared with Tannate of Iron

Charcoal outlet

Attest:

Inventor:

UNITED STATES PATENT OFFICE.

VICTOR DORDET, OF PHILADELPHIA, PENNSYLVANIA.

IMPROVEMENT IN FILTERS.

Specification forming part of Letters Patent No. 188,606, dated March 20, 1877; application filed March 3, 1877.

*To all whom it may concern:*

Be it known that I, VICTOR DORDET, of Philadelphia, Pennsylvania, have invented certain new and useful Improvements in Filters and Filtering Media, of which the following is a specification:

The filtering medium which I contemplate making use of is wool or sponge. This material, in its physical structure, is admirably adapted for filtering purposes. Its chemical composition, however, is a barrier to its use for the purpose. Although it serves admirably to arrest impurities contained in the water, yet it is apt itself to undergo a certain decomposition, which will taint and unpleasantly affect the water. In order therefore to render wool or sponge, or both, practically available, it is necessary to treat it preliminarily in such manner as to render it "dead"—removing or changing those elements of it which otherwise would decompose.

To this end I treat the material with tannate of iron, in any suitable way, as well understood by chemists.

For practical purposes, I generally send the material to a tanning establishment, where it is properly tanned, and I then dip the tanned material for a minute or so in a weak solution of sulphuric acid and oxide of iron, slightly neutralized with liquid ammonia. The proportions of these ingredients, although variable, should be such as to effect, when acting on the tanned wool or sponge, the production of tannate of iron.

The wool or sponge thus treated is to be used in a suitable receptacle as a filtering medium for water.

Figure 1:
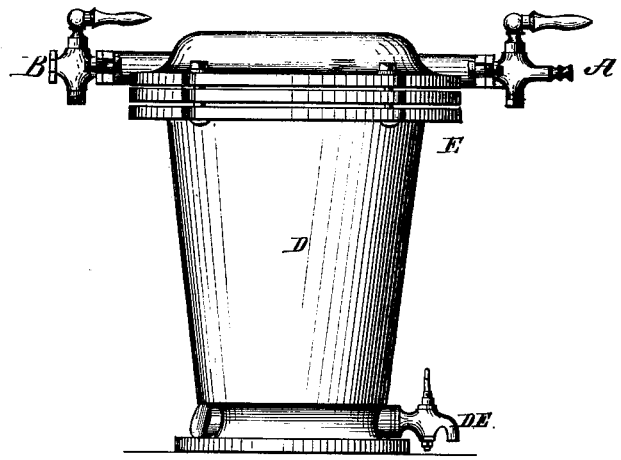
Figure 2:
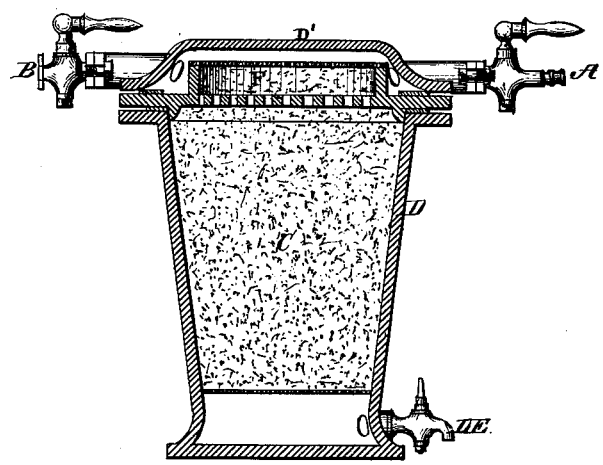

One apparatus adapted for the purpose is shown in Figures 1 and 2 of the accompanying drawing.

It consists of a vessel, D, closed at the top by a removable cover, D', between which and the top of the vessel is held the flange of a cap, F, which contains, preferably, sponge, to arrest the grosser impurities contained in the water. This cap is provided with perforated top and bottom, and with imperforate sides. B is the water-inlet cock, through which the water enters the filter, passing down through the cap F into the filtering-vessel D, which is filled with the wool, sponge, or both, this material resting on a perforated diaphragm, below which is a chamber and discharge-cock, D E, or a discharge-pipe, or both, for the filtered water. The space under the cover D', and surrounding the cap F, is a sediment-chamber, where the coarse substances carried in by the water are deposited. This sediment-chamber can be washed out by opening the flush-cock A, which can also be used to obtain unfiltered water for washing or gardening purposes.

The cocks A and B are attached to tubes or pipes projecting laterally from the cover D, and can be detached therefrom whenever desired.

Fig. 3 is a slightly-modified form of apparatus, in which there is a layer of charcoal below the wool or sponge.

What I claim, and desire to secure by Letters Patent, is—

1. The filtering apparatus, consisting of the vessel for reception of the filtering material, in combination with the cap, vertically through which the unfiltered water passes, the surrounding cover forming a sediment-chamber, and the inlet and flush cocks or openings, arranged laterally in the cover opposite the imperforate sides of the cap as set forth.

2. The combination, in a filtering apparatus, of an inlet pipe or cock above the filtering-chamber, an outlet for the filtered water below the filtering-chamber, and a discharge or flush pipe or cock, the said flush-cock and inlet pipe or cock being on opposite sides of the filter, and on the same level, so that the sediment-chamber above the filtering-chamber may be flushed or swept out by opening the flush-cock, as shown and set forth.

In testimony that I claim the foregoing as my own I affix my signature in presence of two witnesses.

V. DORDET.

Witnesses:
A. POLLOK,
EWELL A. DICK.